United States Patent [19]

Herrmann et al.

[11] Patent Number: 5,163,639
[45] Date of Patent: Nov. 17, 1992

[54] DOOR OPERATING MECHANISM FOR OPENING AND CLOSING AN AIRCRAFT DOOR

[75] Inventors: Dieter Herrmann, Norderstedt; Guenter Kallies, Hamburg, both of Fed. Rep. of Germany

[73] Assignee: Deutsche Airbus GmbH, Hamburg, Fed. Rep. of Germany

[21] Appl. No.: 728,595

[22] Filed: Jul. 11, 1991

[30] Foreign Application Priority Data

Jul. 11, 1990 [DE] Fed. Rep. of Germany ....... 4022067

[51] Int. Cl.$^5$ .............................................. B64C 1/14
[52] U.S. Cl. ..................................... 244/129.5; 49/254; 49/280
[58] Field of Search ............... 244/129.5; 49/324, 358, 49/260, 246, 232, 233, 280, 283, 255, 256

[56] References Cited

U.S. PATENT DOCUMENTS

| | | | |
|---|---|---|---|
| 3,051,280 | 8/1962 | Bergman et al. | 244/129.5 |
| 4,473,201 | 9/1984 | Barnes et al. | 49/280 |
| 4,510,714 | 4/1985 | Kasper et al. | 244/129.5 |
| 4,680,891 | 7/1987 | Perkins | 49/280 |
| 4,720,065 | 1/1988 | Hamatani | 244/129.5 |

Primary Examiner—Joseph F. Peters, Jr.
Assistant Examiner—Anne E. Bidwell
Attorney, Agent, or Firm—W. G. Fasse

[57] ABSTRACT

An operating mechanism for an aircraft door performs all the door motions and locking motions for the opening and closing of the door with the aid of electric motors which operate the respective elements of the mechanism through gear drives or through spindle drives to provide the power or torque moment for the respective motion. The door sealing may be accomplished with contact hardware components or with toggle hardware components for taking up the forces resulting from the internal cabin pressure. The door is hinged to the aircraft body structure by a guiding and supporting hinging element, one end of which is hinged to the aircraft body structure while the other end is hinged to the door structure. The door swinging motions in the opening and closing directions, the door opening and closing motions and the door locking and unlocking motions are all performed by program controlled electric motors. Such motors also control the deployment of an emergency escape slide.

15 Claims, 3 Drawing Sheets

DOOR OPERATING MECHANISM FOR OPENING AND CLOSING AN AIRCRAFT DOOR

FIELD OF THE INVENTION

The invention relates to an operating mechanism for opening and closing an aircraft door. In the closed position such doors must be brought into a formlocking relationship with the aircraft body structure. The required seal must be assured.

BACKGROUND INFORMATION

Aircraft doors must meet several requirements. On the one hand, during operation of the aircraft, the doors must be tightly locked and they must be capable of taking up all loads to which the doors may be exposed. On the other hand, it is necessary that such doors can be opened rapidly and simply in case of an emergency. For taking up all loads aircraft doors assume a formlocking position relative to the aircraft body structure in the closed state of a door in which the door is additionally locked. Doors for aircraft having a pressurized cabin must also be capable to withstand the internal cabin pressure during flight. In connection with passenger aircraft, the requirement must be met that each passenger door is equipped with an emergency slide which must be activated and deployed in an emergency through the operating elements of the door itself.

In order to establish a formlocking connection between the door and the aircraft body structure, and for transmitting the forces resulting from the internal cabin pressure, there are two door closure principles conventionally employed. One principle is the so-called contact principle in which the door is brought into sealing contact with the door frame in the aircraft body structure. The other principle is the so-called toggle principle in which the door is closed in a sealing manner by means of toggle levers.

Doors constructed to operate in accordance with the contact principle comprise along their lateral rims or edges contact hardware. For closing such doors the doors are lowered subsequent to their being tilted into the body structure. The lowering of the closed door by a determined distance is such that the door hardware components contact and rest against respective body contact components and the cooperation of these components makes sure that all outwardly directed forces that are effective on the door are taken up safely.

Doors constructed to operate under the toggle lever principle are equipped along their lateral edges by rotatable toggles which, during the closing movement of the door, extend alongside the door edges and which enter into respective recesses in the door frame. In order to close the door the toggles are rotated within the recesses so that they extend crosswise rather than lengthwise to the door edge, whereby the required formlocking is achieved with the aircraft body structure.

In both types of doors the operational steps, such as closing, locking, activating of the emergency slide, and the respective opposite operations are preformed manually. U.S. Pat. No. 4,720,065 (Hamatani) discloses a door operating system in which the door closes in accordance with the above mentioned contact principle. The operating mechanism arranged inside the door according to U.S. Pat. No. 4,720,065, is so constructed that an operating motion introduced by means of a hand lever arranged on the side of the door facing into the cabin, is transmitted to a lifting shaft, to a closing flap, and to a locking mechanism of the emergency slide. The lifting shaft makes sure that upon opening the door, the door is lifted and that upon closing the door, the door is lowered. The operation of the known door will now be described by way of example, with reference to the sequence of operations occurring during the lifting and during the lowering of the door. The lifting shaft comprises a crank connected laterally to each end of the lifting shaft. These cranks enter with their crank arm into respective guide tracks when the door is swung into the closing position. For lowering the door the lifting shaft is then rotated with the hand operating lever of the door in such a way that the two crank arms travel upwardly on a respective circular path relative to the door, whereby the crank arms bear against the guide tracks so that the door is lowered downwardly, overcoming the friction of the door seal. For opening the door, the latter must first be lifted in the opposite direction by rotating the lifting shaft. It is desirable to reduce the force necessary, especially for lifting the door, to minimize the physical strength of a person required to operate the door. For this purpose a weight compensation device is provided for cooperation with the lifting operation. The compensating device comprises a spring which is cocked while lowering the door and which helps lifting the door prior to opening the door. The mechanism required for performing the just described several functions is very complex and comprises numerous bearings, shafts, levers, journals, and pivots as well as a cam drive. The situation becomes aggravated when at least some of the components must be provided in duplicate to meet so-called failsafe requirements. Due to the large number of mechanically effective components and elements, the production costs for such doors are quite high. Further, it has been noted especially in connection with larger passenger doors that the operation of such doors does require a relatively large bodily strength for lifting these doors even if the compensating device is provided.

The above described facts relating to an aircraft door constructed according to the contact principle, apply substantially also to doors constructed for operation in accordance with the toggle principle. Even though the lifting and lowering is not involved in doors operated in accordance with the toggle principle, a substantial technical effort and expense is still necessary in view of the fact that even toggle locked doors require a substantial number of mechanical structural components. Another disadvantage of the toggle principle is seen in that the toggle levers enter into the respective recesses only when the door is precisely positioned. Without such precise positioning the toggle levers cannot be operated. The required precision construction also increases the effort and expense for producing such doors so that they function without fault.

OBJECTS OF THE INVENTION

In view of the foregoing it is the aim of the invention to achieve the following objects singly or in combination:

to provide an operating mechanism for an aircraft door which will meet safety requirements, yet will require a substantially reduced number of mechanically effective elements to thereby reduce the manufacturing costs of such doors;

to substantially mechanize or automate the operation and function of such doors so that the person operating such doors will not need to have substantial body strength; and to substantially reduce the weight of such doors.

SUMMARY OF THE INVENTION

An operating mechanism for an aircraft door according to the invention is characterized by the combination of the following features. The door is mounted to the aircraft frame by a supporting guide member which permits an outward swinging for opening the door and an inward swinging for closing the door to assume a position in the aircraft body structure, whereby a form locking is achieved between the door and the aircraft frame structure in the closed position and any loads caused by an internal cabin pressure are taken up by a contact or toggle hardware, and wherein all motion transmitting components of the operating mechanism are driven by respective electric motors for the inward and outward swinging of the door, for the closing and opening of the door, and for the locking and unlocking of the door, said motors being program controllable through a central processing unit in which the respective sequence of program steps or of operational steps are stored in an electronic memory.

Each electric motor is controllable individually and in coordination with the control and operation of all the other motors in accordance with the stored program. It has been found that in spite of using a plurality of electromotors, the manufacturing costs have been reduced and the operation has been substantially simplified while simultaneously achieving a reduced structural weight of the door since these motors with their respective gear and/or spindle drives can now be installed substantially directly where the respective operating power is needed, thereby obviating much of the conventionally needed mechanical and/or hydraulic power transmission equipment. More specifically, the reduction in weight is due to the fact that the above mentioned machine components and elements have been reduced substantially in number and in that the electromotors used instead can be constructed to be rather small and light in weight due to lightweight materials that are conventionally used for such electromotors. A further weight reduction is achieved due to the fact that the above mentioned weight compensation spring mechanism is obviated altogether.

BRIEF DESCRIPTION OF THE DRAWINGS

In order that the invention may be clearly understood, it will now be described, by way of example, with reference to the accompanying drawings, wherein:

FIG. 4 is a sectional view along section line IV—IV in FIG. 3.

DETAILED DESCRIPTION OF PREFERRED EXAMPLE EMBODIMENTS AND OF THE BEST MODE OF THE INVENTION

Figure 1:
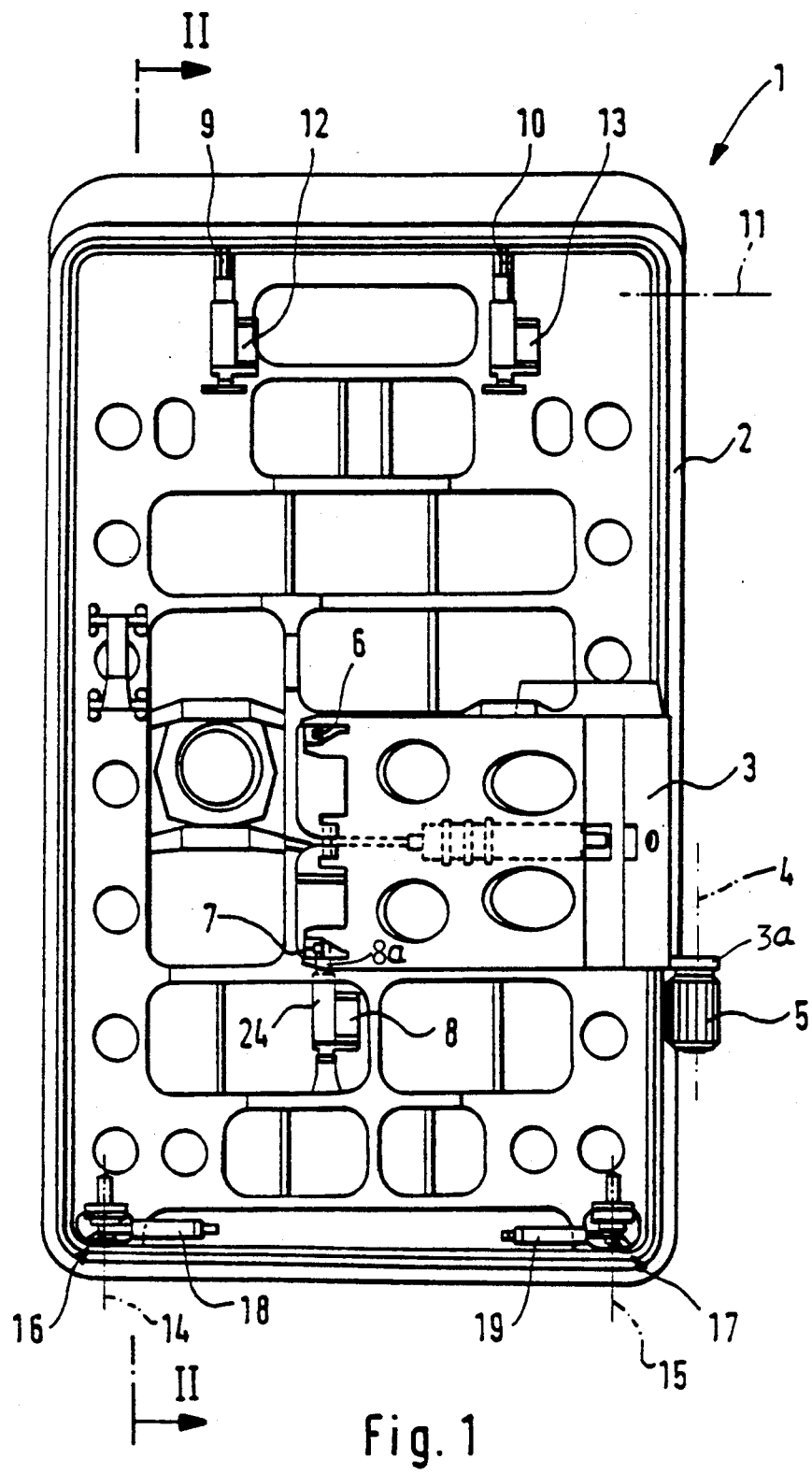
FIG. 1 is a plan view of an electromotoric drive mechanism according to the invention installed in an aircraft door lockable by contact hardware.
Figure 2:
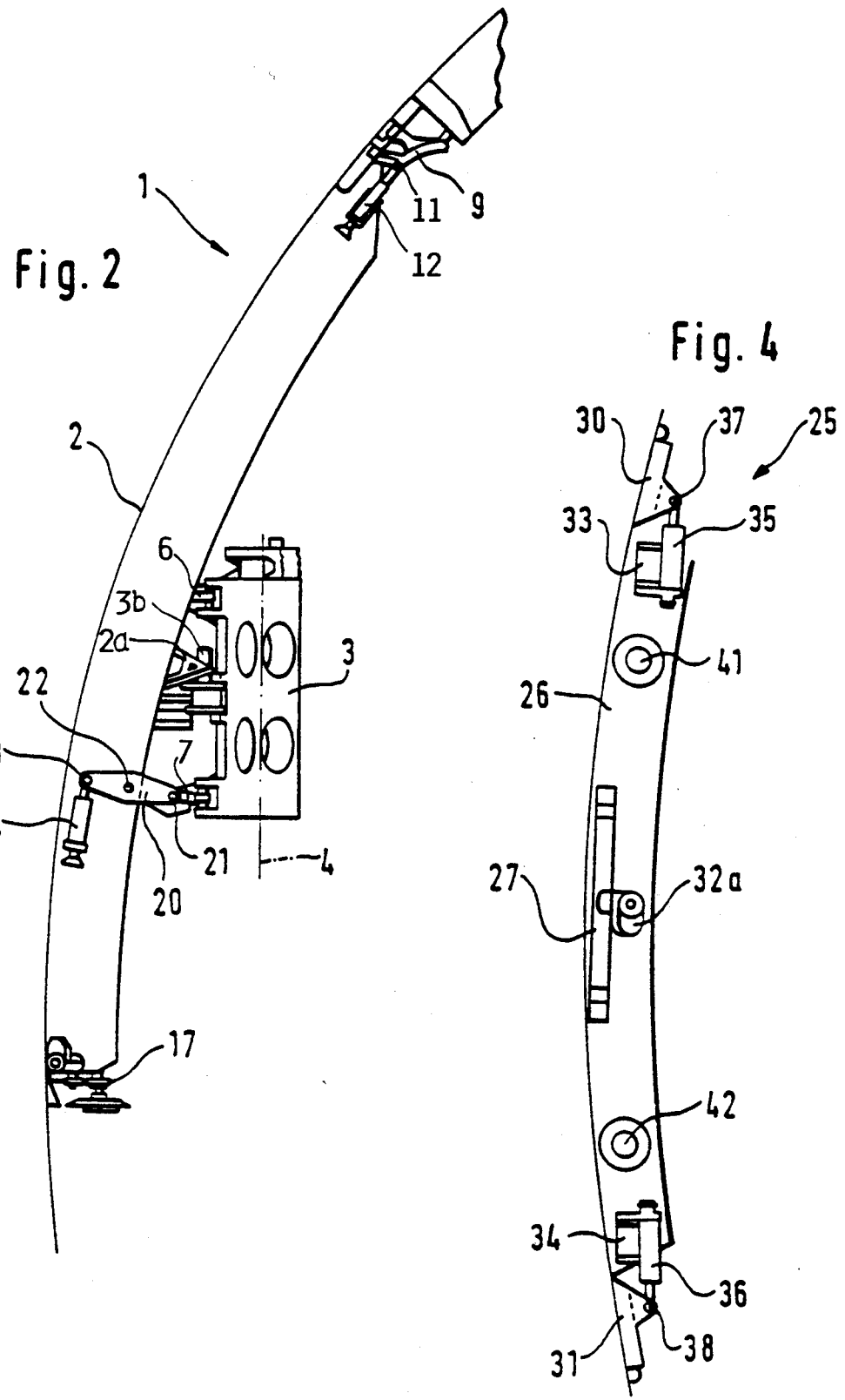
FIG. 2 is a sectional view along section line II—II in FIG. 1.

The aircraft door 1 shown in FIGS. 1 and 2 is constructed in accordance with the contact principle whereby the door is depicted in the closed and locked condition. The door 1 of FIG. 1 is seen as viewed from the inside out of an aircraft cabin, whereby the aircraft body structure surrounding the door opening and the inner covering of the door have been omitted to simplify the illustration. The door 1 comprises a door frame structure 2 carrying the functional units to be described below. The door 1 with its door frame 2 is connected to the aircraft body structure by hinging elements 3 functioning as a supporting and guiding hinge, one end of which is connected to the aircraft body structure, while the other end is connected to the door frame 2. The supporting and guiding hinging element 3 carries the weight of the door during swinging out and swinging in. The supporting and hinging element 3 is hinged to a hinging axis 4 rigidly connected to the aircraft body. The axis 4 is shown symbolically by a dash-dotted line. An electromotor 5 mounted to the aircraft body is connected to drive a hinge arm 3a of the hinging element 3 The electric motor 5 provides the power for swinging the door open and closed. Preferably a reduction gear is used.

The door connected end of the hinging element 3 is secured to the door frame 2 by universal joints 6 and 7 through respective three-point guide links 20. These guide links 20 form, together with the hinging element 3 and the door frame 2, a pivoting quadrangle in the form of a parallelogram, whereby the door 1 is exactly guided when it is lifted relative to the hinging element 3. The power required for lifting and lowering the door is provided by a further electric motor 8 mounted to the door frame 2 and driving a push rod 8a through a spindle drive 24. The push rod 8a is connected to the lower three-point guide link 20 so that it can see-saw up or down about an axis 22 rigidly connected to the door. This see-sawing of the three-point guide link 20 is transmitted to the lower universal joint 7 for lifting and lowering the door. Two locking hooks 9 and 10 are arranged in the upper portion of the door 1. The locking hooks 9 and 10 are tiltable about a horizontal axis 11 rigidly secured to the door frame 2. When the locking hooks 9 and 10 are in their locked state, they engage respective counter elements, not shown, but rigidly secured to the aircraft body. The tilting of the locking hook 9 about the horizontal axis 11 is accomplished by an electromotor 12. Similarly, the tilting of the locking hook 10 about the horizontal axis 11 is accomplished by its own electric motor 13.

Two emergency slide operating levers 16 and 17 are mounted to the door frame 2 at its lower end for journalling about vertical axis 14 and 15 respectively. An electric motor 18 drives the tilting motion of the slide lever 16. An electric motor 19 drives the tilting motion of the slide lever 17.

FIG. 2 shows the connection of the universal joint 7 on the one hand to the supporting and guiding hinging element 3 and on the other hand to the above mentioned guide link 20 or rather three point connecting link 20. The connecting link 20 is pivoted at 21 to the universal joint 7. The opposite end of the connecting link 20 is pivoted at 23 to the spindle drive 24 which is driven by the motor 8 shown in FIG. 1. The connecting link 20 is journalled at 22 to the door frame 2 so that it is able to move in see-saw fashion in response to rotation of the spindle drive 24 to move the door vertically up or down. For this purpose, the door frame 2 is connected through a bracket 2a to a vertical stud 3b which guides the vertical up and down movement of the door frame 2 through the bracket 2a. Similarly, the universal joint 6 is so constructed that it permits a sufficient vertical up and down displacement of the door in a guided manner relative to the hinging element 3 that is journalled at the hinging axis 4 to the aircraft body. The connecting three-point link 20 can be tilted clockwise or counterclockwise about the journal axis 22 by the motor 8 through the drive spindle 24. A clockwise lifting of the left-hand end 23 of the link 20 will lift the door 1. A counterclockwise movement of the link 20 will lower the door. Thus, all motions to be made by the door 1 are performable in response to the drive of the respective electric motors. These electric motors are operated in response to a stored program in a central processing unit. An aircraft attendant merely has to push one button to cause the required operational sequence for opening the door and another button for closing the door.

Figure 3:
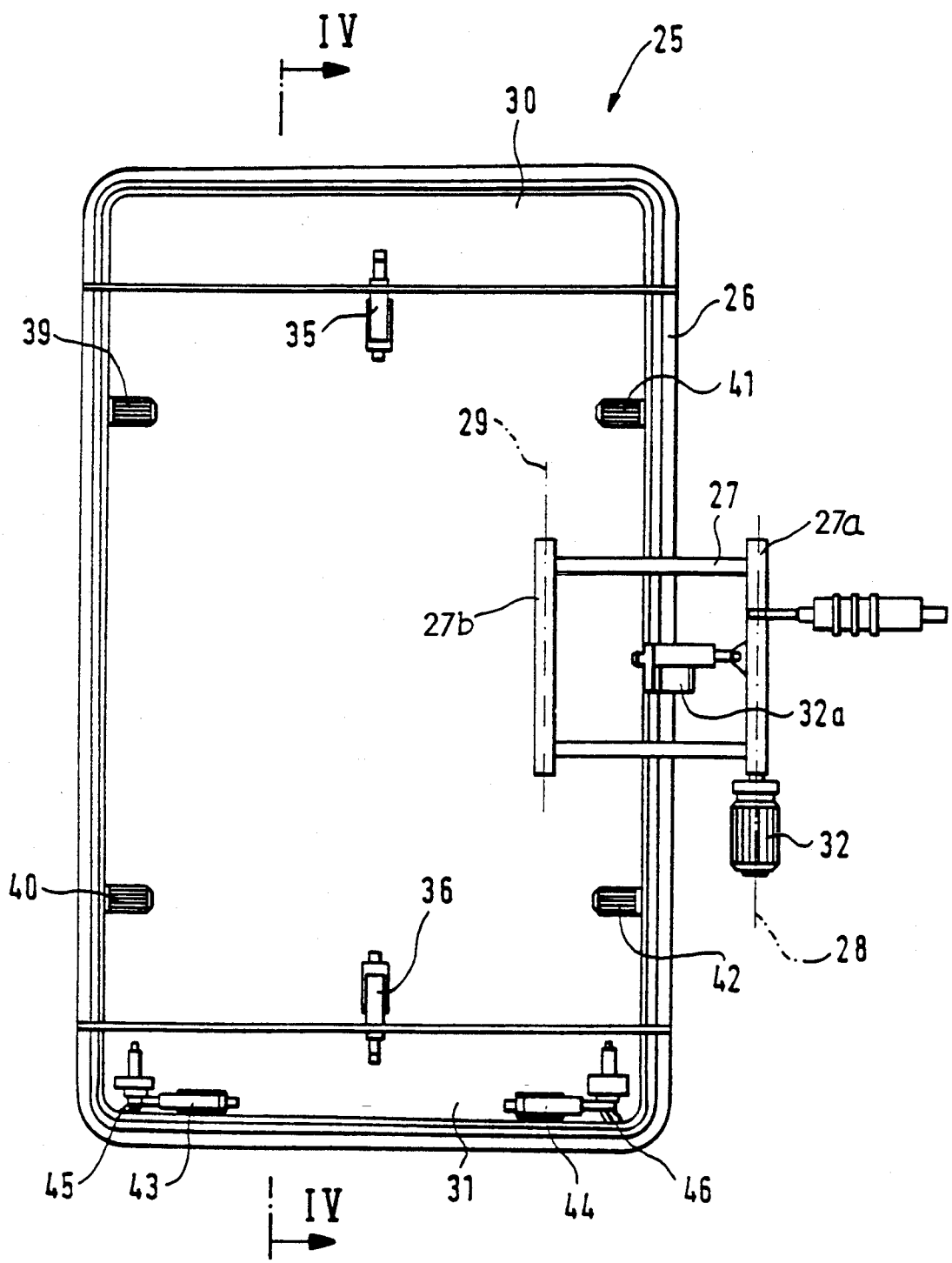
FIG. 3 is a view similar to that of FIG. 1, but showing an electromotoric drive mechanism according to the invention installed in a door which is locked in accordance with the toggle principle mentioned above.

FIGS. 3 and 4 illustrate an aircraft door 25 constructed to be locked in accordance with the toggle principle. The door 25 comprises a door frame structure 26 hinged to the aircraft body structure by a supporting and guiding hinging element 27 having a first vertical member 27a hinged to the aircraft body at a hinging axis 28. The element 27 has a second vertical member 27b hinged to the door frame 26 at a hinging axis 29. The upper edge of the door 25 is constructed as a movable flap for shortening the vertical length of the door when the flap is in a recessed position. Similarly, the lower edge of the door is constructed as a recessable flap for also reducing the vertical length of the door 25. All operations for opening and closing the door 25 are performed by electric motors as follows.

The supporting and guiding hinging element 27 is tiltable or rather hingeable about the hinging axis 28 by an electric motor 32 operatively connected to the vertical member 27a of the hinging element 27. The motor housing is rigidly secured to the aircraft body. A further electric motor 32a provides the power for controlling a relative movement of the door 25 relative to the aircraft body structure or hinging element 27.

The movement of the upper door section 30 between an operative position shown in FIG. 4 and a recessed position not shown is accomplished by an electric motor 33 and a spindle drive 35 journalled to the upper section 30 at the pivot 37. Similarly, the movement of the lower door section 31 back and forth between the operative position shown in FIG. 4 and a recessed position is accomplished by an electric motor 34 through a spindle drive 36 journalled to the lower section 31 at the pivot 38.

The door 25 comprises four so-called toggles of conventional construction not shown for forcing the door into a sealed and locked condition relative to the aircraft body structure. Each of the toggles is driven by its respective electric motor 39, 40, 41, and 42.

All electric motors are operating through respective gear drives or spindles to obtain the required torque moments or adjustment forces. These gear drives or spindles provide a translation of the rotation of the motor output shaft into a slower motion. With regard to the electric motors 39 to 41, driving the locking toggles, respective gear drives are provided for obtaining the proper toggle motion into and out of the locked position.

As shown in FIG. 3, two further electric motors 43 and 44 are provided for driving respective emergency slide mechanisms 45 and 46.

The two example embodiments illustrate quite clearly that expensive and complicated machine elements have been replaced by small electric motors cooperating with respective gear or spindle drives to provide the required power for the operating motions of the door. It is required that the motors with their gear or spindle drives perform the required motions exactly. However, such exact motions are conventionally controllable by computer controlled automation components such as the mentioned motors, gear drives, and spindle drives. For example, the motors 39 to 42 for operating the locking toggles may be constructed as stepping motors so that by responding to the respective programs these motors perform the respective number of revolutions simultaneously and in synchronism with each other in order to bring the respective toggles into the required locking or unlocking position.

With regard to the just mentioned control possibilities, the supporting and guiding hinging element 27 is constructed as a parallelogram also referred to as an artifical parallelogram. For operating such a parallelogram the required angular motion of the element 27 around the hinging axis 28 is measured to provide a control signal for the motor 32a in such a manner that the motor 32a tilts the door 25 relative to the support and guiding hinging element 27 to such an extent that the door during the swinging motion of the hinging element 27 does not perform a rotation relative to the aircraft body.

Although the invention has been described with reference to specific example embodiments, it will be appreciated that it is intended to cover all modifications and equivalents within the scope of the appended claims.

What we claim is:

1. An operating mechanism for an aircraft door having a door frame, comprising door supporting and guiding hinging means for securing said door frame to a body structure of the aircraft, first electric motor means connected to said hinging means for swinging said door in an opening and closing direction, means for closing said door in a closed position relative to said aircraft body structure, second electric motor means for driving said closing means back and forth between a closed door position and an open door position, locking means for locking said door in a closed position, third electric motor means for driving said locking means between a locked and an unlocked state, and a central computer processing unit comprising an electronic memory having a computer program stored therein for operating said first, second, and third electric motor means in response to said computer program, whereby each of said electric motor means is controlled individually and in coordination with the control and operation of all of said electric motor means in accordance with said stored computer program.

2. The operating mechanism of claim 1, wherein said first electric motor means is connected with said supporting and guiding hinging means in such a manner that the hinging means is driven at its end hinged to said aircraft body structure about a fixed hinging axis secured to said aircraft body structure.

3. The operating mechanism of claim 1, wherein said second electric motor means for driving said means for closing is operatively interposed between said hinging means and said door frame in such a way that said door is lifted and lowered relative to the hinging means, whereby lowering the door closes the door, and lifting the door makes the door ready for swinging in an opening direction.

4. The operating mechanism of claim 3, wherein said door is guided relative to said hinging means by a parallelogram, and wherein said second electric motor means drives said parallelogram through a spindle drive.

5. The operating mechanism of claim 1, wherein said locking means comprise locking hooks (9, 10) driven by said third electric motor means for closing and opening said hooks.

6. The operating mechanism of claim 1, further comprising emergency slide operating lever means arranged in a lower zone of said door frame, and fourth electric motor means arranged close to said emergency slide operating lever means for driving said emergency slide operating lever means for deploying an emergency exit slide.

7. The operating mechanism of claim 1, wherein said hinging means comprise a substantially vertical hinging axis (29) near its end connected to said door frame, and wherein a further electric motor (32a) is arranged in such a way that said further electric motor (32a) can tilt the door relative to said hinging means.

8. The operating mechanism of claim 1, wherein said locking means comprise a plurality of locking toggles, said third electric motor means comprising a separate third electric motor for each of said locking toggles, and wherein each of said third electric motors rotates its respective locking toggle in a locking direction or in an unlocking direction.

9. The operating mechanism of claim 1, wherein said means for closing comprise upper and lower door sections hinged to a central door section by substantially horizontal hinging axes, and wherein said second electric motor means are connected for hinging said upper and lower door sections respectively between a door closing position in which said door sections lengthen said central door section, and a recessed position in which the entire length of said door is shortened.

10. The operating mechanism of claim 1, wherein at least some of said electric motor means are constructed as stepping motors.

11. The operating mechanism of claim 1, further comprising speed reduction gear means cooperating with at least some of said electric motor means for translating a rotation of a motor output shaft, into a slower rotational motion.

12. The operating mechanism of claim 1, further comprising speed reduction spindle means cooperating with at least some of electric motor means for translating a rotation of a motor output shaft, into a slower rotational motion.

13. An operating mechanism for an aircraft door having a door frame, comprising door supporting and guiding hinging means for securing said door frame to a body structure of the aircraft, first electric motor means connected to said hinging means for swinging said door in an opening and closing direction, means for closing said door in a closed position relative to said aircraft body structure, second electric motor means for driving said closing means back and forth between a closed door position and an open door position, locking means for locking said door in a closed position, third electric motor means for driving said locking means between a locked and an unlocked state, a central processing unit with a memory having a program stored therein for operating said first, second, and third electric motor means in response to said program, and power transmitting means interconnecting a power output shaft of said second electric motor means to said closing means for driving said closing means, said second electric motor means and said power transmitting means being interposed between said hinging means and said door frame in such a way that said door is lifted and lowered relative to the hinging means, whereby lowering the door closes the door, and lifting the door makes the door ready for swinging in an opening direction.

14. The operating mechanism of claim 13, wherein said power transmitting means comprise guide links (20) forming part of a parallelogram and a spindle drive for operating said parallelogram through said spindle drive to raise and lower said door.

15. An operating mechanism for an aircraft door having a door frame, comprising door supporting and guiding hinging means for securing said door frame to a body structure of the aircraft, first electric motor means connected to said hinging means for swinging said door in an opening and closing direction, means for closing said door in a closed position relative to said aircraft body structure, second electric motor means for driving said closing means back and forth between a closed door position and an open door position, locking means for locking said door in a closed position, third electric motor means for driving said locking means between a locked and an unlocked state, a central processing unit with a memory having a program stored therein for operating said first, second, and third electric motor means in response to said program, and wherein said locking means comprise a plurality of locking toggles, said third electric motor means comprising a separate third electric motor for each of said locking toggles, and wherein each of said third electric motors rotates its respective locking toggle in a locking direction or in an unlocking direction.

* * * * *